(12) United States Patent
Ishikawa et al.

(10) Patent No.: US 6,769,697 B1
(45) Date of Patent: Aug. 3, 2004

(54) GASKET

(75) Inventors: Koichi Ishikawa, Tokyo (JP); Osamu Uchisawa, Miyagi-ken (JP); Toshikatsu Meguro, Miyagi-ken (JP); Hideo Tsukazaki, Tokyo (JP); Tatsuhito Tanaka, Tokyo (JP)

(73) Assignees: Ace Inc., Tokyo (JP); Motoyama Eng. Works, Ltd., Miyagi-Ken (JP); TFC Corporation, Tokyo (JP); Isono Mfg. Inc., Tokyo (JP)

( * ) Notice: Subject to any disclaimer, the term of this patent is extended or adjusted under 35 U.S.C. 154(b) by 323 days.

(21) Appl. No.: 09/657,778

(22) Filed: Sep. 8, 2000

(30) Foreign Application Priority Data

Sep. 9, 1999  (JP) ............................................ 11/255938

(51) Int. Cl.$^7$ ............................................ F16L 17/073
(52) U.S. Cl. ...................... 277/612; 277/639; 277/641; 277/608
(58) Field of Search ................................. 277/593, 637, 277/639, 641, 649, 647, 608, 611, 612

(56) References Cited

U.S. PATENT DOCUMENTS

| | | | |
|---|---|---|---|
| 2,926,937 A | * | 3/1960 | Parsons ...................... 285/350 |
| 3,713,660 A | * | 1/1973 | Luthe |
| 4,303,251 A | * | 12/1981 | Harra et al. ................. 277/614 |
| 5,002,290 A | * | 3/1991 | Pernin |
| 5,226,683 A | * | 7/1993 | Julien et al. ................. 285/363 |
| 5,366,261 A | * | 11/1994 | Ohmi et al. ................. 285/328 |
| 5,433,454 A | * | 7/1995 | Ramberg ..................... 277/643 |
| 5,505,464 A | * | 4/1996 | McGarvey ................... 277/614 |
| 5,669,612 A | * | 9/1997 | Nicholson |
| 5,713,582 A | * | 2/1998 | Swensen et al. |
| 5,716,052 A | * | 2/1998 | Swensen et al. |

FOREIGN PATENT DOCUMENTS

| | | |
|---|---|---|
| JP | 6-20946 | 6/1994 |
| JP | 10-311450 | 11/1998 |

* cited by examiner

*Primary Examiner*—Anthony Knight
*Assistant Examiner*—E Peavey
(74) *Attorney, Agent, or Firm*—Wenderoth, Lind & Ponack, L.L.P.

(57) ABSTRACT

There is provided a gasket comprising a sealing portion and a deformation stopper portion. When the gasket is placed between adjacent surfaces to be sealed of two objects, the sealing portion is engaged by the adjacent surfaces. The deformation stopper portion is engaged by the adjacent surfaces of the objects when the sealing portion has been deformed by a predetermined amount by the adjacent surfaces, thereby preventing excessive deformation of the sealing portion.

4 Claims, 7 Drawing Sheets

GASKET

BACKGROUND OF THE INVENTION

The present invention relates to a gasket, in particular, to a gasket suitable for use in sealing a joint between fluid-passage blocks in which through-holes are provided to form a passage for the supply of a highly pure fluid or liquid to an apparatus used in the production of semiconductor devices.

These fluid-passage blocks are generally made from stainless-steel, and gaskets used to seal joints formed between respective blocks may be made from a metal having super-elastic properties. The use of a super-elastic metal in forming a gasket has the advantage that upon release of a securing force used to tighten the gasket in forming a seal, the gasket reverts to its original shape, whereby it can be reused; and, in addition, such gaskets are capable of accommodating deformation of the fluid-passage blocks caused by exterior forces to which sealed blocks may be subject. Japanese Published Utility Model Application 6-20946 discloses such a gasket. Further, Japanese Laid-Open Application 10-311450 discloses an example of assembled fluid-passage blocks.

Figure 11A:
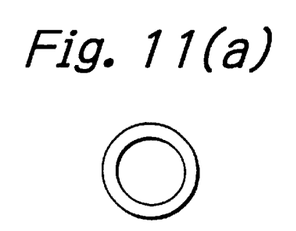
FIG. 11(a) shows a common shape of a conventional gasket.
Figure 11B:
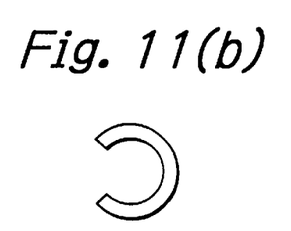
FIG. 11(b) shows another common shape of a conventional gasket.
Figure 11C:
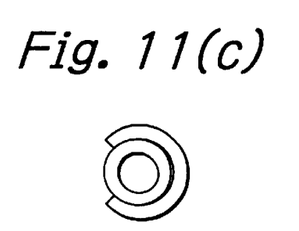
FIG. 11(c) shows a further different shape of a conventional gasket.

FIG. 11 shows common cross-sectional forms of conventional gaskets, These are, an O type, a C type, and a C-O type (C type with a O shaped spring). The O type gasket is the most commonly employed and is able to retain its function under a wide range of environmental stresses, ranging from super-high pressure to super-high vacuum. The C type gasket is advantageous in that by using a relatively weak sealing force as compared with the O-type gasket, an effective seal can be attained under super-high pressure. The C-O type gasket has a high capacity to revert to its original shape upon the release of a sealing force applied thereto; and such a gasket is able to maintain appropriate sealing under cyclic temperature and/or pressure changes. Another type of gasket which has recently come into use exhibits plastic deformation when subject to a sealing force and thus is able to conform with a high degree of accuracy to the shape of the joint between blocks to be sealed.

Figure 12:
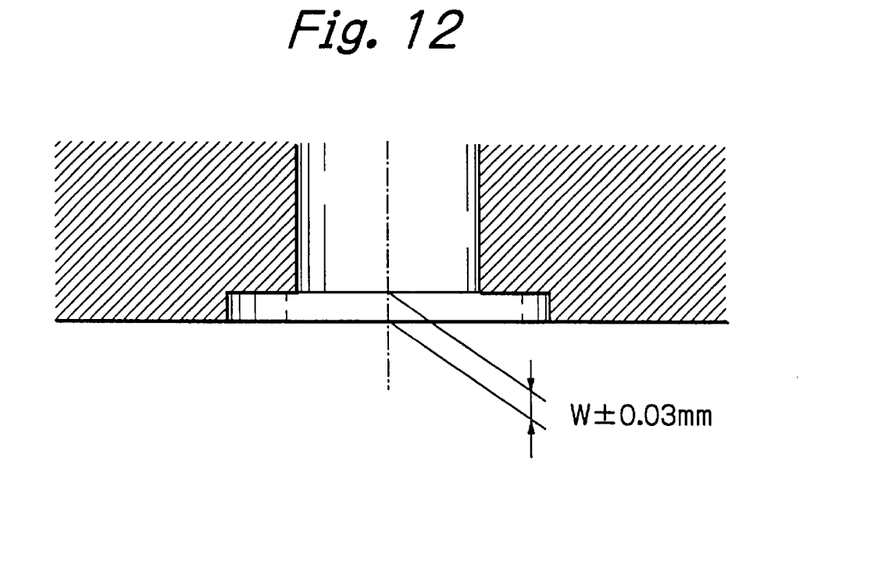
FIG. 12 is a partial cross-sectional view of a fluid-passage block with a gasket receiving recess in which a gasket.
Figure 13:
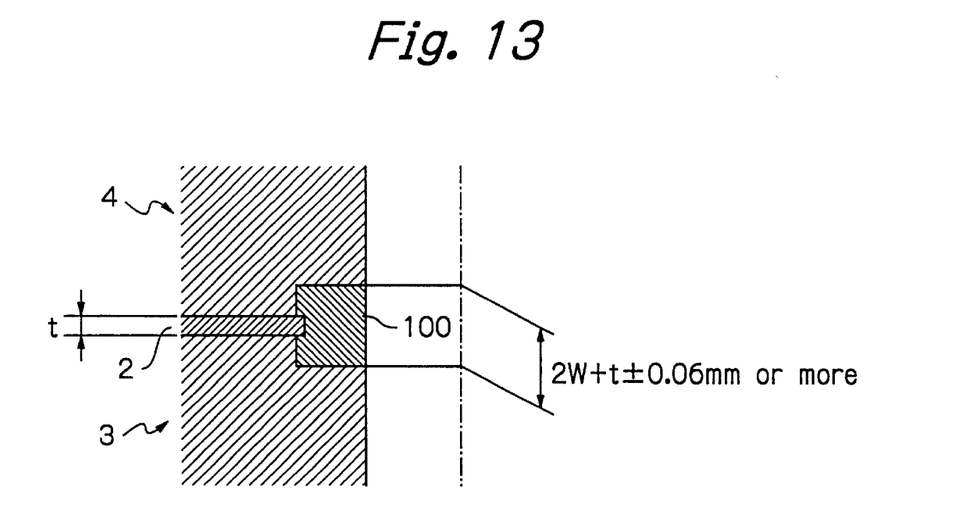
FIG. 13 is a partial cross-sectional view of an assembled fluid-passage blocks with a gasket interposed therebetween.

FIG. 12 is a cross-sectional view of a conventional fluid-passage block which is provided with a gasket receiving recess having a depth "w". FIG. 13 is a cross-sectional view of a part of the left halves (as viewed in the figure) of the fluid-passage blocks 3 and 4 which have been assembled with a gasket 100 interposed therebetween.

Figure 14:
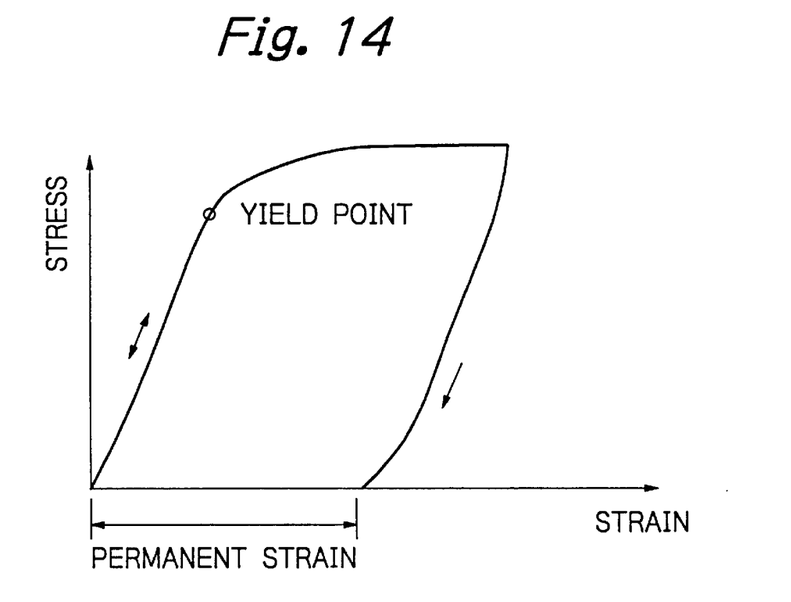
FIG. 14 is a stress-strain diagram relating to a metal which is commonly used to make a gasket.
Figure 15:
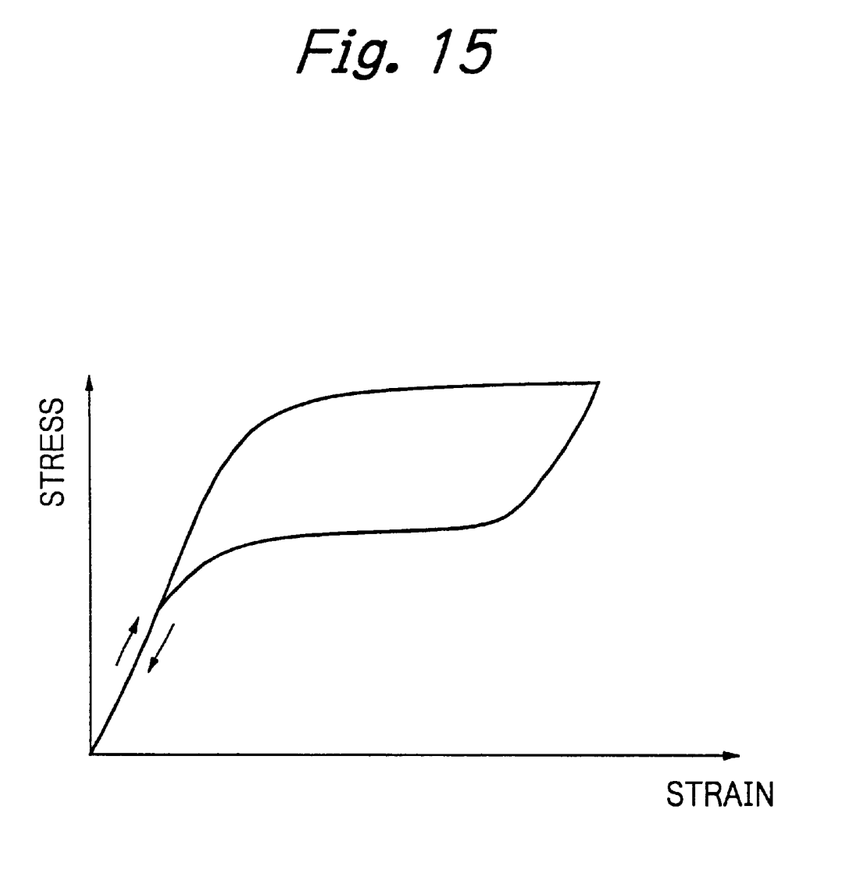
FIG. 15 is a stress-strain diagram relating to a super-elastic metal which may be used to make a gasket.

FIGS. 14 and 15 are diagrams showing characteristics of gasket materials. FIG. 14 is a stress-strain diagram relating to a metal which is commonly used to make gaskets, and FIG. 15 is a stress-strain diagram relating to a super-elastic metal as mentioned above.

It is to be noted that conventional gaskets suffer from the following defects.

First, in gaskets made from a metal such as stainless steel or nickel, both of which exhibit a relatively narrow range of elastic deformation under the imposition of a sealing force, plastic deformation is liable to occur if an excessive force is applied, thus compromising the sealing properties of the gasket.

Second, even if the gasket is not subject to the plastic deformation, once the gasket is temporarily detached from the surfaces of fluid-passage blocks, the gasket might become ineffective in sealing the surfaces of fluid-passage blocks. Consequently, it is required that the gasket is fastened with a large fastening force.

Third, in a gasket made from a metal such as stainless steel or nickel, frequent mounting and dismounting of the gasket will result in molecular changes in the metal of the gasket in relation to surfaces to be sealed, resulting in an ineffective seal.

Fourth, since gasket receiving recesses formed in surfaces of fluid-passage blocks may have a tolerance of, for example, ±30 microns with a consequent cumulative variation between recessed surfaces of ±60 microns, and as it is also necessary to compensate for any possible variation in size of the gasket per se, a relatively large amount of portion of the gasket is required to be compressed or deformed; for example, such a compressible amount is generally required to be in the order of about 200–400 microns.

Fifth, since most conventional gaskets exhibit plastic deformation to some degree upon being subject to a sealing force, the original shape of the gasket is liable to be lost, making repeated use impracticable. In extreme cases, gaskets made from certain kinds of metals may be able to be used once only.

Sixth, even where a gasket is made from a super-elastic metal, there is a danger that plastic deformation will occur due to an excessive fastening force which might be mistakenly imposed thereon, thus resulting in a deterioration of restorative properties of the gasket, and a consequent decline in its sealing properties.

Seventh, in a conventional gasket, if a surface of a fluid-passage block contains a flaw, or a surface of the gasket to be engaged with the surface to be sealed contains a flaw, it is likely that the gasket will be unable to provide an effective seal.

Lastly, surfaces of gaskets and fluid-passage blocks to be sealed by gaskets are required to be finely machined, as any irregularity in the surfaces will prevent a proper seal from being formed. Such fine machining is both costly and time-consuming.

SUMMARY OF THE INVENTION

The present invention has been made in the light of the above-noted problems to which the various prior art gaskets are subject According to the present invention, there is provided a gasket comprising a sealing portion and a deformation stopper portion. When the gasket is placed between adjacent surfaces of two objects, the sealing portion is engaged by the adjacent surfaces. The deformation stopper portion is engaged by the adjacent surfaces of the objects when the sealing portion has been deformed by a predetermined amount by the adjacent surfaces, thereby preventing excessive deformation of the sealing portion.

In one embodiment, the deformation stopper portion has opposite sides facing adjacent faces of the objects and the sealing portion also has opposite sides facing the adjacent faces of the objects, with the opposite sides of the sealing portion having compressible portions extending towards and positioned close to the adjacent surfaces of the objects relative to the opposite sides of the deformation stopper portion.

The sealing portion and the deformation stopper portion may be annular and the deformation stopper may be positioned radially outside the sealing portion. The deformation stopper portion has a radially outer surface, with a gasket plate engaging recess being provided in the radially outer surface so that, upon installation, the gasket is supported by a gasket support plate in such a manner that the gasket extends through a through-hole provided in the support plate, with the recess being engaged by projections formed along the peripheral edge of the hole.

The gasket may be made from a variety of metals, including super-elastic metals. The gasket metal may be harder than the metal of the objects having surfaces to be sealed.

DETAILED DESCRIPTION OF THE INVENTION

Figure 1:
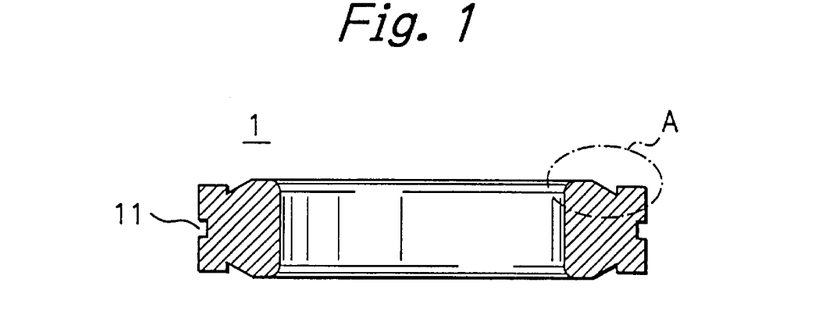
FIG. 1 is a cross-sectional view of a gasket in accordance with the present invention.
Figure 2:
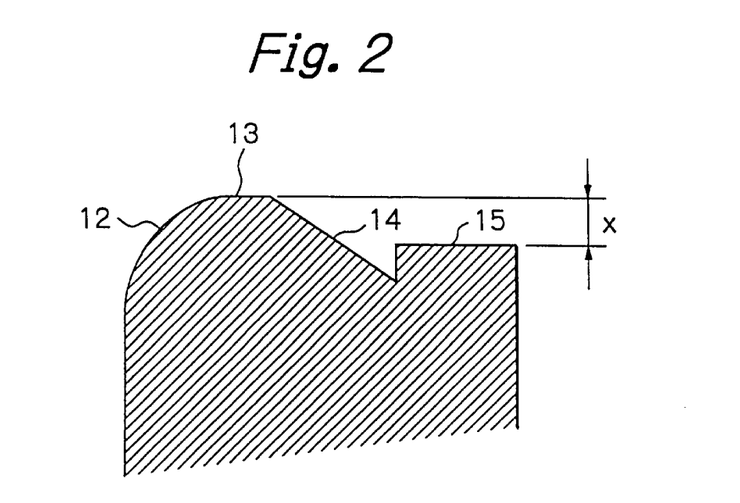
FIG. 2 is an enlarged view of a portion encircled by a circular phantom line A in FIG. 1.

With reference to FIG. 1, there is shown a cross-sectional view of a gasket in accordance with an embodiment of the present invention. The gasket is generally in the shape of an O-ring and has an outer annular portion or deformation stopper portion and an inner annular portion or sealing portion integrally formed with the deformation stopper portion. As most clearly shown in FIG. 2, the sealing portion includes a radially inner surface formed to be parallel to a center axis of the gasket, and upper and lower surfaces each of which comprises a rounded surface 12 connected to the radially inner surface, a flat horizontal surface 13 and a slanted surface 14. The deformation stopper portion includes upper and lower horizontal surfaces 15 and a radially outer surface parallel to the center axis, the outer surface being provided with an annular recess 11. The difference x between the level of the flat surface 13 of the sealing portion and the level of the flat surface 15 of the deformation stopper portion generally represents an area to be compressed, as explained hereinbelow.

Figure 3:
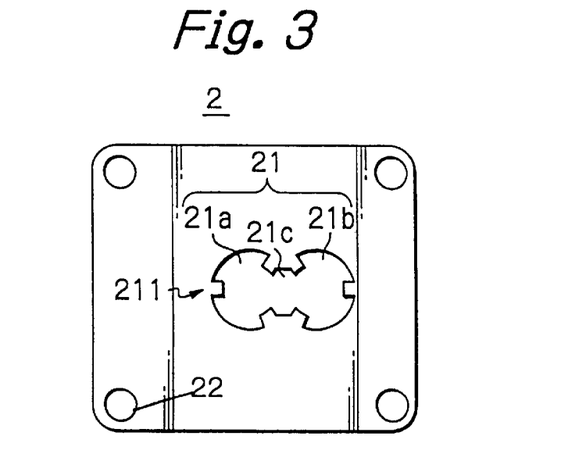
FIG. 3 is a plan view of a gasket supporting plate used when the gasket of FIG. 1 is assembled together with two fluid-passage blocks as shown in FIG. 4.

FIG. 3 is a plan view of a gasket holding plate 2. As shown, the plate is made of a generally rectangular thin plate and is provided at the center thereof with a gasket holding hole 21. The hole 21 includes right and left openings 21a and 21b for supporting gaskets 1, and a center small opening 21c connecting the openings 21a and 21b. Along the peripheral edge of each of the right and left openings, there are provided three projections 211 equally spaced apart from each other. The projections 211 are adapted to be engaged with the annular recess 11 formed in the radially outer surface of the gasket to thereby hold the gasket. The gasket holding plate 2 is provided with four holes 22 at the corners thereof through which fastening bolts pass.

Figure 4:
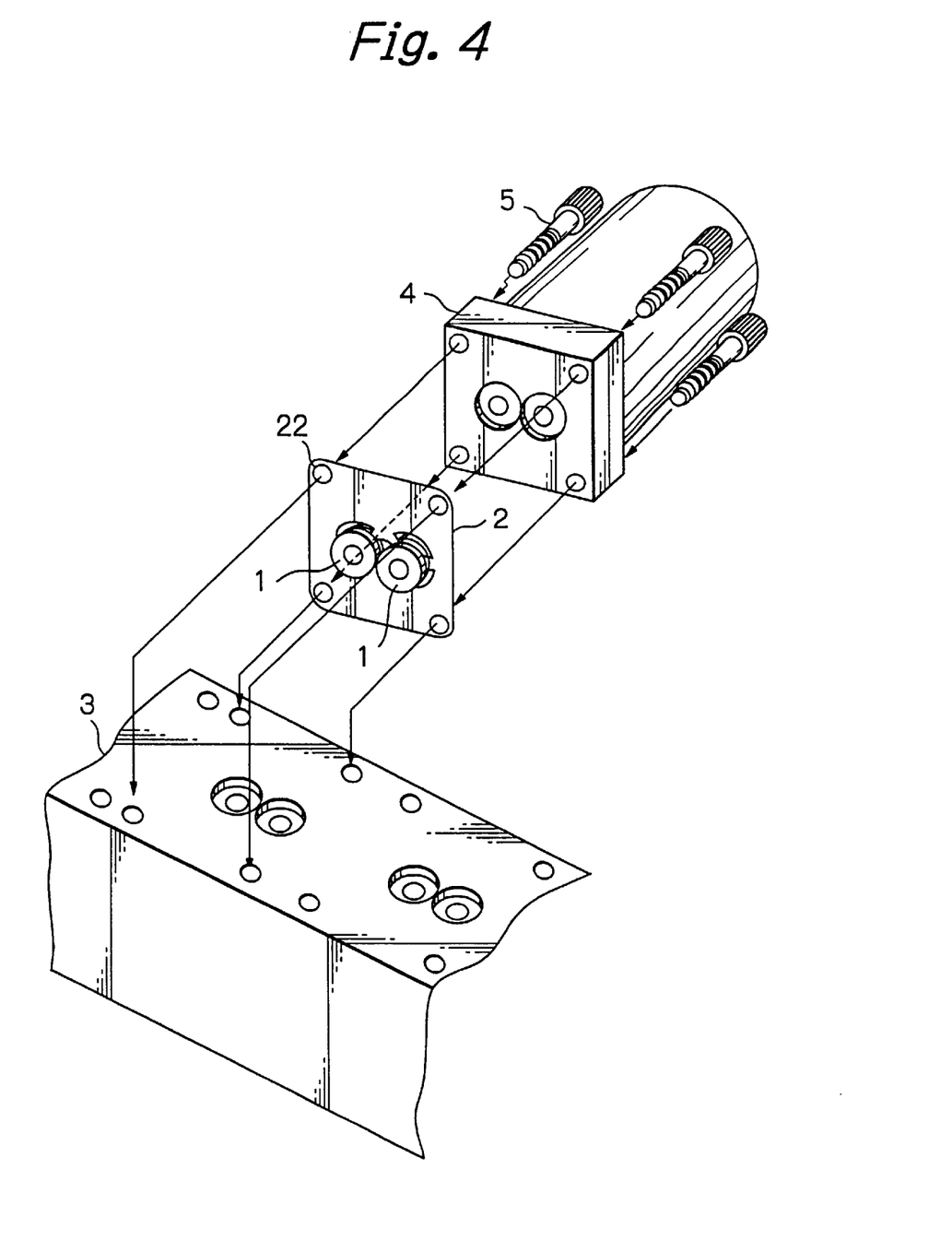
FIG. 4 is an explanatory view showing how the gasket is assembled together with the two fluid-passage blocks.

FIG. 4 illustrates a method of assembly of a fluid-passage blocks 3 and 4 and gaskets 1. In the illustrated case, two gaskets 1 are held by the gasket holding plate 2 and placed and subject to a sealing force between gasket receiving recesses formed in the first fluid-passage block 3 and the second fluid-passage block 4 by bolts 5, whereby a sealed fluid passage is formed in the assembled blocks.

Figure 5:
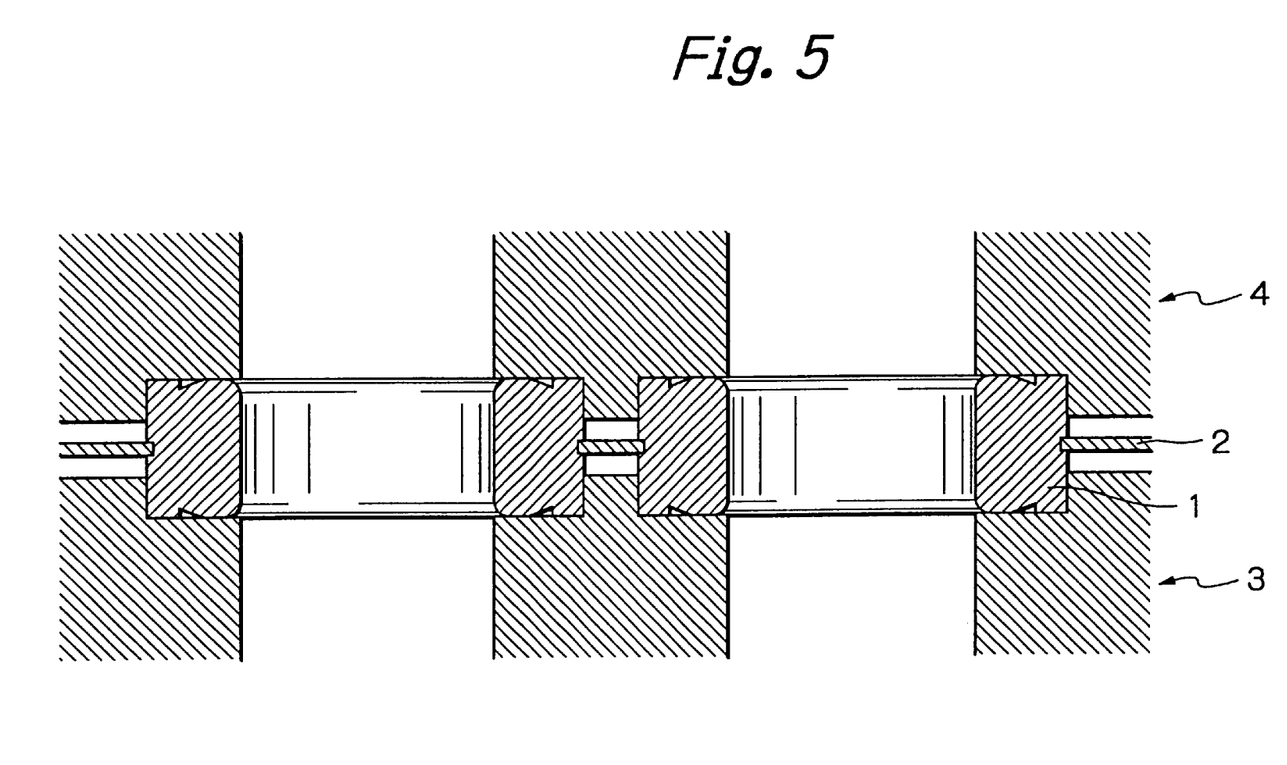
FIG. 5 is a partial cross-sectional view of the assembled gasket and the fluid-passage blocks.
Figure 6:
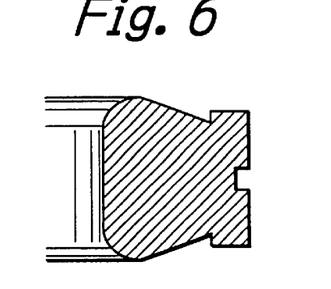
FIG. 6 shows another cross-section form of a gasket in accordance with the present invention.
Figure 7:
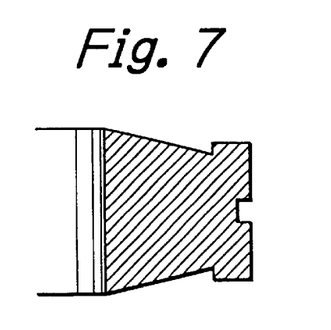
FIG. 7 shows a further different cross-sectional form of a gasket in accordance with the present invention.
Figure 8:
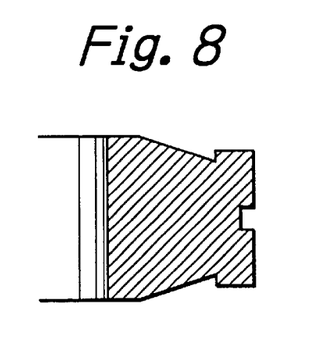
FIG. 8 shows another cross-sectional form of a gasket in accordance with the present invention.
Figure 9:
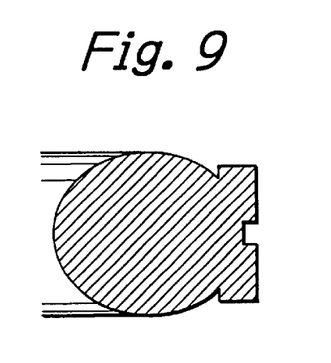
FIG. 9 is a variation of the cross-sectional form of a gasket in accordance with the present invention.
Figure 10:
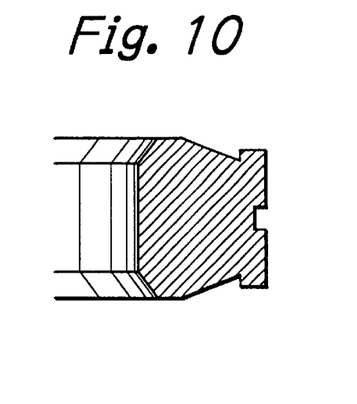
FIG. 10 is a further variation of the cross-sectional form of a gasket in accordance with the present invention.

Upon tightening the bolts 5, the bottom surfaces of the gasket receiving recesses of the blocks 3 and 4 engaged with the upper and lower flat surfaces 13 of the sealing portion of the gasket gradually deform or compress the sealing portion and come into contact with the upper and lower flat surfaces 15 of the outer deformation stopper portion. When the bottom surfaces of the gasket receiving recesses engage with the upper and lower horizontal surfaces 15, a sealing force will increase suddenly thereby signaling to an operator that a proper seal has been attained, thus preventing the imposition of excessive compression of the gaskets, and ensuring adequate sealing off the fluid passages formed in the assembled blocks 3 and 4.

The gasket 1 may be made from a super-elastic metal such as a nickel-titanium alloy which is characterized by a shape retention memory effect. Such a metal is transformed from a parent phase to a martensitic phase at a temperature lower than a martensitic transformation point, or at a temperature under which the metal is plastically deformed when an external force is imposed thereon. Although, when the metal is heated to a temperature higher than the martensitic transformation point, the phase changes to the parent phase and the metal reverts to its original shape. Further, although when the metal is subject to an external force at a temperature higher than the martensitic point, the metal is also subject to martensitic transformation and deformation; and if the external force is removed, the martensitic phase changes to the parent phase and the original shape is restored.

As shown in FIG. 14, it is generally common that when a metal is deformed in excess of a yield point, plastic deformation results, and thus even if a force applied to cause deformation is relieved, a certain amount of permanent deformation will remain. However, as shown in FIG. 15, a super-elastic metal such as nickel-titanium is capable of reverting to its original form even if deformation has exceeded a yield point, provided that the metal is at a temperature higher than the martensitic transformation point. Accordingly, when a gasket is made from such a super-elastic metal, even if assembled fluid-passage blocks are subject to an excessive exterior force causing deformation in the surfaces of the blocks to be sealed, the gasket is able to accommodate such deformations and maintain an effective seal. Further, the gasket will revert to its original shape when a sealing force to which it has been subjected is released, thus enabling the gasket to be used repeatedly. Furthermore, a gasket made of a super-elastic metal is able to provide an effective seal under a relatively weak force. The super-elastic metal used to make the gasket may include a copper-zinc-aluminum alloy, a copper-aluminum-nickel alloy and the like.

FIGS. 6–10 illustrate variations of the cross-sectional forms of gaskets in accordance with the present invention. These gaskets include, in common, an outer annular portion or deformation stopper portion, and an inner annular portion or sealing portion which has upper and lower surfaces extending axially outside relative to the upper and lower surfaces of the deformation stopper portion, respectively, as is the case in the first embodiment described with reference to FIG. 2. These gaskets are secured between fluid-passage blocks in the same way and are able to bring about the same effects as the gaskets of the first embodiment.

When a gasket is made from a super-elastic metal which is harder than a stainless steel (SUS316L), which is the metal of choice in fabricating fluid-passage blocks, upon applying a sealing force to the gasket, sealing portions of the gasket are pressed against and intrude into the surfaces of the fluid-passage blocks. This is advantageous in that intrusion enables effective sealing of the surfaces to be attained, even if flaws are present therein, or if surface roughness is present. The same effect applies if the surfaces of the gasket itself contain flaws or are rough. It has been confirmed that such a gasket is able to seal a surface of a fluid-passage block containing flaws extending to about fifty microns in depth. As such, it becomes easy to assemble the gasket with fluid-passage blocks, as it is not necessary for an operator to test for micro flaws, and maintenance is also similarly facilitated.

Although some concern has existed concerning the ability of a gasket to retain its sealing effect with respect to a recessed portion formed in the surface of a block following reassembly, it has been shown that since the surface containing the recess tends to return to its original shape, when the block is re-assembled the sealing portion of the gasket again presses against the recess and provides an effective seal. In fact, it has been confirmed that such a gasket can be re-used in excess of twenty times.

As stated above, in accordance with the present invention, a gasket is provided with a deformation stopper portion whereby the gasket is prevented from being excessively deformed. This makes it possible to prevent the gasket from suffering plastic deformation. Accordingly, even if an excessive exterior force or impact force is imposed on assembled fluid-passage blocks, a gasket installed therein will be able to retain an effective seal. Further, the gasket will also revert to its original shape when dismounted, enabling it to be used repeatedly. Furthermore, it is possible to secure the gasket between fluid-passage blocks and create a seal therebetween using a relatively weak force, thus facilitating assembly and disassembly of the fluid-passage blocks.

What is claimed is:

1. An annular gasket comprising:

an annular solid sealing portion adapted to be engaged by and pressed between adjacent surfaces of two objects; and an annular solid deformation stopper portion which is thinner than said annular solid sealing portion in a direction of compression of said annular gasket, said annular solid deformation stopper portion being positioned either radially outside or radially inside of and formed integrally with said annular solid sealing portion such that said annular solid deformation stopper portion is adapted to be engaged by the adjacent surfaces of the two objects when said annular solid sealing portion has been compressively deformed in the direction of compression of said annular gasket by a predetermined amount by the adjacent surfaces so as to prevent excessive deformation of said annular solid sealing portion.

2. An annular gasket according to claim 1, wherein said annular solid deformation stopper portion is positioned radially outside of said annular solid sealing portion and has a radially outside surface formed with an annular groove, said annular groove being coaxial with the axis of said annular gasket and adapted to be engaged with an edge of an opening of a gasket holding plate.

3. An annual gasket according to claim 1, wherein said an annular solid sealing portion and an annular solid deformation stopper portion are made from a super-elastic metal.

4. An annual gasket according to claim 2, wherein said an annular solid sealing portion and an annular solid deformation stopper portion are made from a super-elastic metal.

* * * * *